March 15, 1932.  G. F. COLBERT ET AL  1,849,708
REAR VIEW MIRROR
Filed Dec. 19, 1930
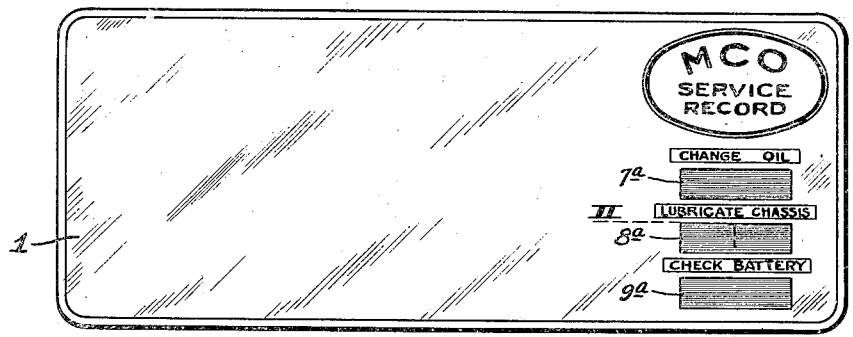
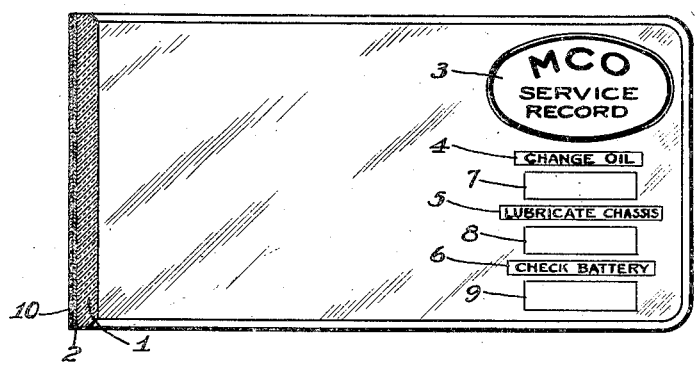
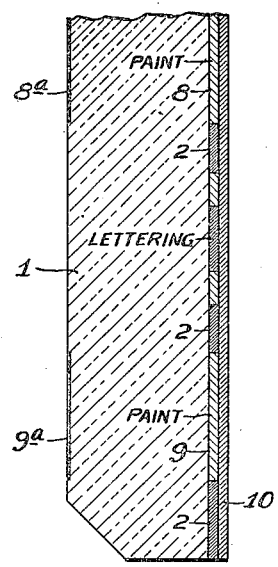
INVENTORS
Geo. F. Colbert
and
Wm. H. Colbert
by
James C. Bradley
Atty.

Patented Mar. 15, 1932

1,849,708

UNITED STATES PATENT OFFICE

GEORGE F. COLBERT, OF PITTSBURGH, AND WILLIAM H. COLBERT, OF BRACKENRIDGE, PENNSYLVANIA, ASSIGNORS TO LIBERTY MIRROR WORKS, A CORPORATION OF PENNSYLVANIA

REAR VIEW MIRROR

Application filed December 19, 1930. Serial No. 503,438.

The invention relates to rear view mirrors for use in automobiles. It has for its object the provision of an improved mirror, a portion of whose area is utilized to provide a service record so that the driver's attention is directed to conditions about the car which require attention at definite intervals of time or service. A further object is to accomplish the foregoing result in a construction which is of neat, compact form, of a permanent character, and so arranged that any data inscribed upon the record areas of the mirror by a pencil will be clearly and distinctly visible, but easily erased when it is desired to replace it with new data. One embodiment of the invention is shown in the accompanying drawings, wherein:

Figure 1 is a front view of the mirror. Fig. 2 is a section on the line II—II of Fig. 1 on a much enlarged scale, the thickness of the films employed being exaggerated to make the showing more distinct. And Fig. 3 is a view similar to that of Fig. 1 but without the showing of the ground areas on the front of the glass.

Referring to the drawings, 1 is a glass plate having its front face polished and the major portion of its rear face covered with a metallic film 2 of silver, mercury, gold, or lead sulphide preferably deposited in accordance with the process of our patent No. 1,662,565. After the metallic film is applied, certain portions thereof are removed so as to leave (1) lettering such as that shown in Figs. 1 and 3, surrounded by the clear glass areas 3, 4, 5, and 6, and (2) the three clear glass areas 7, 8, and 9 shown in Fig. 3. The process employed for giving the lettering and clear glass areas is preferably a photo etching process, such as that set forth in our application, Serial Number 355,507, but any other suitable method may be employed.

The areas 3, 4, 5, 6, 7, 8, and 9 are now painted with light colored paint so as to provide a light background for the lettering and to give white areas at 7, 8, and 9.

The front face of the glass is provided with three rectangular ground or sand blasted areas 7a, 8a, and 9a (Fig. 1) corresponding in size and shape to the painted areas 7, 8, and 9 and opposite thereto. These ground areas will take a pencil mark on which service data may be placed in pencil, the painted areas behind the ground areas serving to make the pencil notations much clearer than would otherwise be the case. As a protection, the entire rear surface of the plate and its films is covered with a coat of shellac 10 or other suitable material.

As shown, the three sets of lettering above the three ground areas are "Change oil," "Lubricate chassis," and "Check battery," but this is merely illustrative, and other terms may be employed when desired. The user will ordinarily mark the mileage in the two upper rectangles and the date in the lower one. This record is then always before him, so that the data are less liable to be overlooked than if placed in some other location. The pencil marks are easily rubbed out without injury to the ground surface when it is desired to change the record.

What we claim is:

1. In combination, a glass plate having a polished front face except a marking area formed by removing a limited portion of the polished surface to provide a surface which will take a pencil mark, lettering on the back surface of the glass adjacent such area and visible from the front of the glass, and a metallic coating of a color contrasting to that of said area on the back surface of the glass surrounding said area and surrounding the lettering, but spaced away from the lettering.

2. In combination, a glass plate having a polished front face except a marking area formed by removing a limited portion of the polished surface to provide a surface which will take a pencil mark, lettering on the back surface of the glass adjacent such area and visible from the front of the glass, and a metallic reflecting coating on the back surface of the glass of a darker color than said marking area and surrounding said area and said lettering, but spaced away from the lettering, said lettering being of the same reflecting material as said coating.

3. In combination, a glass plate having a polished front face except a marking area formed by removing a limited portion of the polished surface to provide a surface which will take a pencil mark, metallic reflecting lettering on the back face of the glass adjacent such area and visible from the front of the glass, a coating of light colored material of approximately the size and shape of said area on the back face of the glass opposite to said area, a coating of light colored material on the back face of the glass surrounding the letters, and a metallic reflecting coating of a darker color than said area covering the back face of the glass and surrounding the areas covered by the light coated material.

In testimony whereof, we have hereunto subscribed our names.

GEORGE F. COLBERT.
WILLIAM H. COLBERT.